US008017550B2

(12) United States Patent
Chao et al.

(10) Patent No.: US 8,017,550 B2
(45) Date of Patent: Sep. 13, 2011

(54) CATALYTIC ADSORBENTS FOR MERCURY REMOVAL FROM FLUE GAS AND METHODS OF MANUFACTURE THEREFOR

(75) Inventors: Chien-Chung Chao, Williamsville, NY (US); Steve J. Pontonio, Eden, NY (US)

(73) Assignee: Praxair Technology, Inc., Danbury, CT (US)

( * ) Notice: Subject to any disclaimer, the term of this patent is extended or adjusted under 35 U.S.C. 154(b) by 1239 days.

(21) Appl. No.: 11/224,149

(22) Filed: Sep. 12, 2005

(65) Prior Publication Data
US 2006/0204418 A1 Sep. 14, 2006

Related U.S. Application Data

(63) Continuation-in-part of application No. 11/078,509, filed on Mar. 14, 2005, now abandoned.

(51) Int. Cl.
*C01B 31/12* (2006.01)
(52) U.S. Cl. .................................. 502/417; 502/427
(58) Field of Classification Search .................. 502/417, 502/427
See application file for complete search history.

(56) References Cited

U.S. PATENT DOCUMENTS

| | | | |
|---|---|---|---|
| 1,984,164 | A | 12/1934 | Karlsruhe |
| 3,758,037 | A | 9/1973 | Marion et al. |
| 3,886,093 | A * | 5/1975 | Dimitri .................. 502/406 |
| 3,958,957 | A | 5/1976 | Koh et al. |
| 4,107,084 | A | 8/1978 | Repik et al. |
| 4,159,306 | A | 6/1979 | Borst |
| 4,242,226 | A * | 12/1980 | Siren ........................ 502/4 |
| 4,273,619 | A | 6/1981 | Angelo, II |
| 4,551,155 | A | 11/1985 | Wood et al. |
| 4,603,119 | A | 7/1986 | Karl et al. |
| 4,692,380 | A | 9/1987 | Reid |
| 4,894,122 | A | 1/1990 | Lazcano-Navarro et al. |
| 5,096,570 | A | 3/1992 | Utz et al. |
| 5,168,088 | A | 12/1992 | Utz et al. |
| 5,187,141 | A | 2/1993 | Jha et al. |
| 5,212,144 | A | 5/1993 | Schwartz et al. |
| 5,266,024 | A | 11/1993 | Anderson |
| 5,275,853 | A | 1/1994 | Silvis et al. |
| 5,276,000 | A | 1/1994 | Matthews et al. |
| 5,292,708 | A | 3/1994 | Karl |
| 5,382,559 | A | 1/1995 | Carugati et al. |
| 5,403,548 | A | 4/1995 | Aibe et al. |
| 5,425,996 | A | 6/1995 | Wilkie et al. |
| 5,435,980 | A | 7/1995 | Felsvang et al. |
| 5,444,031 | A | 8/1995 | Hayden |
| 5,510,565 | A | 4/1996 | Tan et al. |
| 5,556,447 | A | 9/1996 | Srinivasachar et al. |
| 5,614,459 | A | 3/1997 | Mondragon et al. |
| 5,698,317 | A | 12/1997 | Kurokawa et al. |
| 5,787,823 | A | 8/1998 | Knowles |
| 6,027,551 | A | 2/2000 | Hwang et al. |
| 6,033,786 | A | 3/2000 | Fatica et al. |
| 6,136,749 | A | 10/2000 | Gadkaree et al. |
| 6,206,949 | B1 | 3/2001 | Kobayashi et al. |
| 6,395,145 | B1 | 5/2002 | Altman |
| 6,439,139 | B1 | 8/2002 | Jones |
| 6,451,094 | B1 | 9/2002 | Chang et al. |
| 6,521,021 | B1 | 2/2003 | Pennline et al. |
| 6,533,842 | B1 | 3/2003 | Maes et al. |
| 6,589,621 | B1 | 7/2003 | Beckerdite et al. |
| 6,595,147 | B2 | 7/2003 | Teller et al. |
| 6,638,489 | B2 * | 10/2003 | Otsuka et al. .............. 423/245.1 |
| 6,719,956 | B1 | 4/2004 | Gaur et al. |
| 6,726,888 | B2 | 4/2004 | Lanier et al. |
| 6,797,251 | B1 | 9/2004 | Bennett et al. |
| 6,878,358 | B2 | 4/2005 | Vosteen et al. |
| 6,953,494 | B2 | 10/2005 | Nelson, Jr. |
| 7,029,734 | B1 | 4/2006 | Wuest et al. |
| 7,195,818 | B2 | 3/2007 | Kong et al. |
| 7,704,921 | B2 | 4/2010 | Bool, III et al. |
| 7,767,007 | B2 | 8/2010 | Chao et al. |
| 2004/0003716 | A1 | 1/2004 | Nelson, Jr. |
| 2005/0039598 | A1 | 2/2005 | Srinivasachar |
| 2008/0107579 | A1 | 5/2008 | Downs et al. |
| 2008/0193763 | A1 | 8/2008 | Hunt et al. |

FOREIGN PATENT DOCUMENTS

| | | |
|---|---|---|
| EP | 0 327 039 | 8/1989 |
| EP | 0433677 | 6/1991 |
| JP | 2004-1688836 | 6/2004 |

OTHER PUBLICATIONS

Howard, 'Mossbauer Study of Cobalt Ions Adsorbed from Solution onto Activated Charcoal' in Carbon vol. 26 #4 pp. 559-563 1988 (no month).*
Freeman et al., 'Studies of Activated Charcoal Cloth V. Modification of Pore Structure by Impregnation with Certain Transition Metal Salts and Oxo-complexes' in Carbon vol. 27 #1 pp. 85-93 1989 (no month).*
Mercury Control Technology R&D Program Review Meeting on Aug. 12-13, 2003 at Pittsburgh, PA, , "Assessment of Low Cost Novel Sorbents for Coal-Fired Power Plant Mercury Control", Combined Power Plant Air Pollutant Control Mega Symposium (Washington, D.C., Aug. 30-Sep. 2, 2004).
U.S. Appl. No. 60/425,236, filed Nov. 5, 2002, Hunt.
Rezaiyan et al, "Gasification Technologies A Primer for Engineers and Scientists", pp. 5-16, 35-63, 87-117, Text copyright 2005.
Higman et al, "Gasification", pp. 12 and Chapters 3-5, Text copyright 2003.
Peri, "Assessment of the Commercial Potential for Small Gasification Combined Cycle and Fuel Cell Systems Phase II Final Draft Report", pp. 12, 46-52,55-58, Mar. 2003.

(Continued)

Primary Examiner — Stuart Hendrickson
(74) Attorney, Agent, or Firm — Donald T. Black

(57) ABSTRACT

The present invention provides catalytic adsorbents formed from doping activated carbon with a dispersed halide salt. The catalytic adsorbents provided herein are stable and harmless at room temperature, yet allow for chemical adsorption at elevated temperatures typical of those for flue gas streams. The present invention also provides methods of manufacturing the doped activated carbon adsorbents.

5 Claims, 10 Drawing Sheets

OTHER PUBLICATIONS

Doe published paper, "Development of Activated Carbons from Coal Combustion By-Products", DOE award No. DE-FG26-99FT40593, pp. 1-25, Sep. 2003.

Bool, et al, "Production of Powdered Activated Carbon for Mercury Capture Using Hot Oxygen", MEGA Symposium, Baltimore MD, 2008.

DOE published paper "Development of Activated Carbons from Coal Combustion by-Products", DOE award No. DE-FG26-99FT40593, Jul. 2000.

"Surface treating: how and how much" Converting Magazine, pp. 36,38, 40 and 42, Dec. 1994.

* cited by examiner

US 8,017,550 B2

CATALYTIC ADSORBENTS FOR MERCURY REMOVAL FROM FLUE GAS AND METHODS OF MANUFACTURE THEREFOR

CROSS-REFERENCE TO RELATED APPLICATION

This application is a continuation-in-part application and claims priority to U.S. application Ser. No. 11/078,509, filed Mar. 14, 2005, now abandoned the entire contents of which are incorporated herein by reference.

TECHNICAL FIELD

The present invention relates generally to catalytic adsorbents for use in the removal of mercury from flue gas streams and methods of manufacturing such catalytic adsorbents.

BACKGROUND OF THE INVENTION

The toxicity of mercury to humans and the environment has long been known. It is known for example that mercury exposure can cause neurological damage in humans. A particularly devastating example of the harmful effects of mercury occurred in Minamata, Japan in the 1950's where organic mercury byproducts of acetaldehyde production were discharged into the local bay. The byproducts were consumed and metabolized by fish. By consuming fish in the bay, wide spread neurological damage and birth defects among the local population were reported.

Coals used for generating electric power often contain about 0.1 ppm mercury. In the United States alone, about 50 tons of mercury are discharged as vapor in stack gas every year. Through chemical and biological processes, this mercury can become concentrated in fish by many thousand fold, thereby entering human food supplies at harmful levels.

The effort to remove trace mercury from air, water, natural gas, and other industrial streams has a long history, however, removing mercury from coal burning flue gas streams is a very different problem.

Prior art techniques for removing mercury from air or hydrocarbons at room temperature generally have limited relevance to removing mercury from flue gas streams. Mercury has a high atomic weight and adsorption temperature is a significant issue. At room temperature, the dispersion interaction with carbon is sufficient to immobilize mercury atoms. At about 300° F. (the temperature of many flue gas streams), however, physical adsorption is no longer able to hold down the volatile elemental mercury.

In addition, sufficient contact time with rapidly moving flue gas streams is another issue for mercury removal. The total time for flue gas, from generation by combustion to exit through the stack, is often less than 10 seconds. Either as injected powder, where adsorbent fly amid flue gas is for about 2 seconds, or as filter cake on bags in a bag house, the contact time between flue gas and activated carbon captured by the filter is less than one second.

The demand on reactivity and reaction kinetics by flue gas cleaning cannot be properly tested by conventional packed beds. Conventional packed beds are insufficient for flue gas cleaning because the volume of flue gas is so large, the cost for compressing it to push it through a packed bed is prohibitive. For "in-flight adsorption" or "filter adsorption", the contact time with flue gas is many orders of magnitude less than conventional packed beds. Consequently, test results from conventional packed beds are of limited relevance for flue gas.

Further issues relating to the removal of mercury from flue gas include the small concentration levels of mercury in the flue gas streams. The concentration of mercury in flue gas streams is in $\mu g/m^3$ whereas the concentration of mercury in many other industrial processes is on the order of $mg/m^3$ (such as garbage incineration). Much early work involved streams other than coal burning boilers and considered effluents containing mercury in the 5 $\mu g/m^3$ range as fully purified. That is not much lower than the initial concentration of mercury in the flue gas.

Above all, prior art techniques consider the adsorption of mercury as an event between the adsorbent and the mercury. While this is true in air or hydrocarbon streams at room temperature, flue gas contains highly polar and reactive components that can play both an interfering and enabling role for mercury removal. One model composition used for flue gas contains about: 6% $O_2$, 12% $CO_2$, 8% $H_2O$, 1600 ppm $SO_2$, 400 ppm NO, 50 ppm HCl, 20 ppm $NO_2$, and 12 $\mu g/m^3$ elemental Hg.

Prior art attempts to remove mercury from flue gas of coal burning boilers have included various techniques. One approach has focused on adding halogen salts into coal prior to combustion such that the combustion process generates hydrogen halide gases and then injecting powder carbon downstream into the flue gas at a lower temperature. Some mercury is captured by interaction between the hydrogen halide gases, activated carbon and mercury. Another approach has been to add hydrogen halides or elemental halogen together with activated carbon to a lower temperature flue gas.

U.S. Pat. No. 1,984,164 to Karlsruhe (1934) proposes carbon or silica gel or other adsorbents impregnated with elementary halogen for removal of mercury from room air. Other prior art attempts have included adding halide salts to coal before combustion since these salts are known to be very stable. The combustion process oxidizes halides to halogen and further reacts with hydrogen to yield hydrogen halides. For example, U.S. Pat. No. 5,435,980 to Felsvang et al. (1995) suggest adding chloride or a chlorine containing material into the coal before or during combustion or adding HCl into flue gas upstream of or in the drying-absorption zone.

U.S. Patent Application No. 2004/0003716 A1 to Nelson, Jr. discloses a method for removing mercury and mercury containing compounds from combustion gas by injecting an adsorbent into the flue stream. The sorbent is prepared by treating a carbonaceous substrate with a bromine containing gas. Bromine gas is known to be highly toxic by inhalation, ingestion or skin contact. HBr is also known to be corrosive. In addition, bromine and HBr compounds are reactive and can easily be added onto alkenes. Further, bromine is reactive with aromatics.

U.S. Pat. No. 6,533,842 B1 to Maes et al. (2003) disclose powder adsorbents which contain about 40% carbon, 40% calcium hydroxide, 10% cupric chloride and 10% $KI_3$ impregnated carbon to remove mercury from a high temperature, high moisture gas stream.

In December 2000, the United States Environmental Protection Agency (EPA) made its regulatory decision that mercury emissions from coal-fired electric generating plants need to be controlled.

In the field of the mercury removal from flue gas streams, it would therefore be desirable to provide adsorbents having improved adsorbent characteristics in the flue gas temperature range and that can be economically and efficiently manufactured.

BRIEF SUMMARY OF THE INVENTION

The present invention provides catalytic adsorbents in which a halide salt is dispersed on activated carbon and the oxidation catalytic activity of the activated carbon promotes the formation of mercury halide. At the same time, the adsorbent qualities of activated carbon retain the mercury halides thus formed. The present invention recognizes that while the halide salts are stable and harmless at room temperature, these doped activated carbons are capable of forming mercury halogen compounds at elevated temperatures typical of those found in flue gas streams, and in the presence of reactive components typical of flue gas. These mercury halogen compounds are retained on the surface of the activated carbon. Moreover, the increased adsorbent capacity and faster rate of adsorption result in a need for smaller quantities of adsorbent relative to an undoped activated carbon formed from the same starting material.

A catalytic adsorbent composition for removal of mercury from a flue gas stream thus includes an activated carbon having a dopant (i.e, a halide salt) dispersed thereon. The cation of the dopant used for the halide salt in accordance with the present invention can be an alkaline, alkaline earth, or transition metal (e.g., Na, Ca, Mg, Cu and K). The anion involved can be bromide or chloride. Particularly preferred dopants include, but are not limited to, NaCl, $CaCl_2$, $CuCl_2$, $CuBr_2$, NaBr, KBr, $CaBr_2$ and $MgBr_2$.

The halide salt is inert with respect to mercury and the activated carbon at room temperature. At elevated temperatures (e.g., 200°-570° F.) and in the presence of typical flue gas compositions, mercury halogen compounds are formed and retained on the activated carbon. While not intending to be bound by any theory, it is believed that any or all of the following or a combination of the following may occur. An oxidant (for example, oxygen form the flue gas or oxidant on the activated carbon) oxidizes the mercury and the anion of the dopant provides a counter ion for the mercury ion as oxidized by the oxidant. Alternatively or in addition, the oxidant oxidizes the anion in the salt and the oxidized anion in turn oxidizes the mercury to form a mercury halogen compound on the activated carbon. In addition or in the alternative, acidic gases present in the flue gas react with the dopant salt to yield a hydrogen halide. The hydrogen halide is then oxidized by an oxidant and yields a halogen species. The halogen species then reacts with the mercury to form a mercury halogen compound that is then adsorbed by the activated carbon.

The present invention also provides methods of manufacturing such doped activated carbon adsorbents that are both economical and safe. The catalytic adsorbents of the present invention can be made from a variety of methods. In one embodiment, the catalytic adsorbents can be formed by placing an activated carbon in an aqueous solution containing a halide salt to form a mixture, stirring the mixture until a homogeneous slurry is formed and drying the activated carbon such that water from the aqueous solution evaporates and the halide salt is dispersed on the surface of the activated carbon.

The inventors appreciate that conditions to burn coal to produce power and the conditions to activate carbonaceous feedstock to manufacture activated carbon are substantially different. For example, the temperature of a boiler in a combustion chamber is very high and there is sufficient oxygen to oxidize all carbon that is present. Halide salts can therefore be oxidized and undergo complex reactions to yield hydrogen halides. In contrast, the temperature range during carbon activation is about 1200°-2000° F., much lower than the boiler temperature. The small amounts of oxidant are rapidly consumed and the surfaces of the carbon remain reductive. Thus, halide salts can pass through the activation process intact. Doping of activated carbons can therefore be accomplished by doping coal. Given that halide salts in flue gas on activated carbon at about 270° F. are reactive to mercury, it was amazing to discover that an activating gas containing oxidant can leave halide salts intact during the activation process.

In another exemplary method of manufacture, the catalytic adsorbents can be made by feeding a presoaked and dried mixture of carbonaceous feedstock and halide salt or a dry mixture of halide salt and carbonaceous feedstock into a reaction chamber together with an activating gas stream. When a mixture (presoaked and dried or dry) of halide salt and carbonaceous feedstock is used, the activating gas stream may contain air and/or steam, $O_2$, $CO_2$, $N_2$, CO or mixtures thereof. The carbonaceous feedstock and the activating gases are fed into the reaction chamber under conditions and for a residence time sufficient to form a powder activated carbon having halide salts dispersed on the surface of the powder activated carbon. In this method, the reaction chamber can be a batch type reactor such as a tube furnace, a mixing chamber or a reactor designed for continuous mode operation (e.g., a fluidized bed reactor, a burner or the like). The dopant is formed of a cation selected from the group including an alkaline metal, an alkaline earth metal, and a transition metal (e.g, Na, K, Mg, Ca and Cu) while the anion is selected from bromide and chloride. In some embodiments, the dopant may be selected from the group including: NaCl, KCl, $CaCl_2$, $CuCl_2$, $CuBr_2$, NaBr, KBr, $CaBr_2$ and $MgBr_2$.

In this embodiment, the mixture of carbonaceous materials and halide salts can be obtained by soaking the coal with salt solution or by dry mixing. These two methods are similar except the manner in which the dopant is introduced. Doping by dry mixing may be desirable because it can reduce the processing cost. The degree of effectiveness of dry doping was unexpected given that mixing for doping is desirable at molecular levels and given that coal and salt particles are typically in the micron size range (i.e. many orders of magnitudes above the molecular level).

The catalytic adsorbents of the present invention are suitable for use in the removal of mercury from a gas stream containing an oxidant and/or acidic gases at an elevated temperature such as a flue gas stream exiting a boiler or combustion process. In this process, the catalytic adsorbents of the present invention are injected into the flue gas stream for an in-flight mode of mercury capture. As discussed above, the dopant is inert with respect to the mercury at room temperature. At flue gas temperatures and in the presence of the activated carbon, oxidant and/or acidic gases, however, the dopant effectively removes mercury from the flue gas stream. The mercury is retained on the activated carbon in the form of mercury halogen compounds and can be separated from the flue gas stream together with the fly ash.

BRIEF DESCRIPTION OF THE DRAWINGS

For a more complete understanding of the present invention and the advantages thereof, reference should be made to the following Detailed Description taken in conjunction with the accompanying drawings in which.

Similar reference characters refer to similar parts throughout the several views of the drawings.

DETAILED DESCRIPTION

Figure 1:
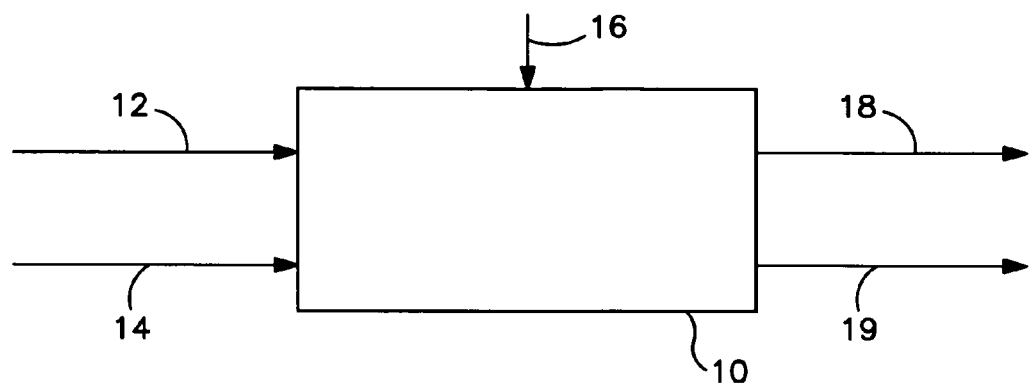
FIG. 1 illustrates one embodiment for manufacturing catalytic adsorbents in accordance with the present invention.

The present invention provides catalytic adsorbents suitable for use in the removal of mercury from flue gas streams at elevated temperatures. The catalytic adsorbents of the present invention include compositions having an activated carbon with a dopant dispersed on the activated carbon. The dopant is a halide salt. The cation of the dopant can be an alkaline, alkaline earth, or transition metal while the anion of the dopant can be bromide or chloride. The catalytic adsorbents of the present invention can be formed from a variety of methods.

The present invention also provides methods of using these compositions for mercury capture at elevated temperature in the presence of acidic gases and/or oxidative gases that are commonly found in flue gas streams generated by coal burning.

The mercury capture action is a synergistic combination of components in the adsorbent compositions, the flue gas stream as well as the flue gas stream temperature. As will be appreciated from the examples provided hereinbelow, activated carbon by itself at 270° F. does not adsorb mercury in a nitrogen stream. KBr doped silica gel does not adsorb an appreciable amount of mercury, even in the presence of full flue gas. KBr doped graphite does not adsorb mercury at all. Bromide salt doped activated carbons, however, are particularly efficient adsorbents in flue gases as they can remove mercury to extremely low levels. In addition, they are able to remove some mercury in a nitrogen stream.

As discussed hereinabove, alkaline, alkaline earth and transition metal halides are harmless salts and inert to mercury and activated carbon at room temperature. At about 200°-570° F. (e.g., 270° F.), however, and in the presence of acidic gases and/or oxidative gases of flue gas, these doped activated carbon compositions are capable of capturing mercury with high efficiency. Unused halide salts remain in their salt form.

The catalytic adsorbents of the present invention also perform well in flue gas streams generated by burning low chloride coal (e.g., Powder River Basin (PRB) coal from Wyoming) where current adsorbents such as Norit FGD carbon do not function efficiently.

The present invention thus provides for halide salts to be dispersed on activated carbon such that the salts retain their chemical inertness at room temperature, but react with mercury in hot flue gas to yield non volatile mercury halide. More particularly, at temperatures in the range of about 200°-570° F., and in the presence of acidic and/or oxidative gas from the flue gas, halide salts react with mercury and assist the activated carbon to capture the mercury, which is present in very low concentrations in flue gas streams. The catalytic adsorbents of the present invention utilize the very fast kinetics at elevated temperatures to optimize both physical adsorption as well as chemical adsorption. The reactivity of the halide salts as used herein is thus a cooperative phenomenon.

As discussed hereinbelow, the catalytic adsorbents of the present invention can be made from a variety of methods. The adsorbents can be made from commercially available powdered activated carbon (PAC) or from raw carbonaceous material. Exemplary PACs suitable for use in the invention include, but are not limited to, FGD (available from Norit America, Inc.), ashless activated carbon powder made from purified petroleum coke and carbon fiber powder made by carbonization of rayon fiber. It will be appreciated that other activated carbons can also be used in the present invention.

The catalytic adsorbents of the present invention can be made from various techniques. In one embodiment of the invention, the adsorbents can be manufactured by soaking activated carbon in an aqueous solution of halide salts. This approach is an economical and safe process relative to treating activated carbon with hydrogen halides or halogen gases.

In this embodiment, the minimum amount of water necessary to make a solution of the salt is utilized. The cation of the dopant can be an alkaline, alkaline earth, or transition metal. The anion involved can be bromide or chloride. Suitable salts for use in the invention therefore include, but are not limited to, NaCl, $CaCl_2$, $CuCl_2$, $CuBr_2$, NaBr, KBr, $CaBr_2$ and $MgBr_2$. In some embodiments, KBr, NaBr or $CaBr_2$ may be preferred and in some embodiments, NaBr or KBr may be the most preferred salt.

The PAC, preferably in powder form, is placed in the aqueous solution and the mixture is stirred until it becomes a homogeneous slurry and such that there is sufficient contact time between the salt solution and PAC that the salt solution becomes dispersed on the PAC. It will be appreciated by those skilled in the art that the PAC has porosity such that the solution and hence the halide salt will disperse into the PAC.

In this approach, the amount of salt necessary for the aqueous solution is determined based on the amount of PAC and the ratio of the salt to PAC that is desired for a particular adsorbent (i.e., the dopant level in the desired PAC determines the concentration of the salt solution). In some embodiments, the ratio of the dopant level to that of the PAC is 1:10,000 to 30:100. In more preferred embodiments, the ratio of dopant to PAC is 1:4000 to 10:100 and in other embodiments, the ratio of dopant to PAC is 0.1:100 to 7:100.

The salt solution containing the PAC is allowed to soak and then allowed to sufficiently dry such that the PAC is free flowing. During this time, the water evaporates and the salt enters the pore volume of the PAC and becomes dispersed on the surface of the PAC. After the PAC is dried, it is in powder form. It may be ground and passed through an appropriate size desired mesh. While not to be construed as limiting, the PAC may be passed through a 200 mesh. In this manner, the PAC can be used for mercury removal at less than or equal to a 200 mesh material. It will be appreciated by those skilled in the art that the adsorbent can be treated for appropriate size depending on the intended use of the adsorbent. For example, smaller mesh (e.g., 400 mesh) may be desirable in some applications.

It is believed that the catalytic adsorbents of the present invention will perform well for mercury removal from flue gas streams at elevated temperatures given the dispersed salts on the surface of the PAC. While not intending to be bound by any theory, it is believed that the salt is inert with respect to elemental mercury at room and high (i.e. in the range of combustion zone) temperatures. At elevated temperatures of about 200-570 F (for example, at about 270-300 F), however, and in the presence of oxidative and/or acidic gases in the flue gas, and the doped activated carbon, mercury in the flue gas stream can be oxidized and effectively removed therefrom.

An alternative method to soaking a PAC in an aqueous solution as described above is to spray water droplets containing the desired halide salt on the PAC in a manner such that the halide salts become dispersed as discussed above. Such an approach can be used in connection with the activated char produced in commonly owned U.S. patent application Ser. No. 11/078,517, entitled "Production of Activated Char Using Hot Gas" to Bool et al., filed on Mar. 14, 2005 and commonly owned U.S. patent application Ser. No. 11/224,590, entitled "Production of Activated Char Using Hot Gas" to Bool et al., filed on even date herewith, both of which are incorporated herein in their entirety by reference.

An alternative method for manufacturing catalytic adsorbents suitable for use in the present invention is shown in FIG. 1. In this embodiment, the catalytic adsorbents can be manufactured by presoaking a prepulvurized carbonaceous feedstock in an aqueous solution of an alkaline, alkaline earth or transition halide salt. Alternatively, the prepulverized carbonaceous feedstock may be soaked in an alcohol (e.g., ethanol) solution containing the alkaline, alkaline earth or transition halide salt. The presoaked feedstock in then exposed to an oxidizing gas mixture such as air and steam at an elevated temperature in a reaction chamber to produce catalytic adsorbents and an exhaust gas.

Catalytic adsorbents prepared directly from carbonaceous feedstock can provide significant cost savings relative to processes which first make activated carbon, then followed by doping the activated carbon to manufacture the catalytic adsorbent. Instead of presoaking, the catalytic adsorbents can also be manufactured by dry mixing alkaline, alkaline earth or transitional metals halide salt powder with prepulvurized carbonaceous feedstock. The mixing action is desirable to be thorough, i.e. as close to molecular mixing as possible. For example, mixers such as multivector fluidization technology of NLI Alfr. Andersoen a.s. or plow mixer with shear action by Scott Equipment Co. can be used to accomplish sufficient mixing. In bench top levels, at very small scale, mixing was achieved by grinding with mortar and pestle.

The dry mixed feedstock is then exposed to an activating gas mixture containing components such as air, steam, $O_2$, $N_2$, $H_2O$, $CO_2$, CO or mixtures thereof at an elevated temperature such as 1200-2000° F. in a reaction chamber to produce catalytic adsorbents and an exhaust gas. The activation gas mixture can be highly oxidative or highly reduction or any where in between. The chemical composition of carbonaceous materials determines the requirement on oxidation power of the activation gas mixture, which in turn determines the composition of the activating gas mixture. For example, high grade (high carbon content) coal may need a mixture of high oxidative power to provide active surface. For lignite or other high oxygen content carbonaceous material, low oxidative power gas is needed to provide high yield of activated carbon product.

Dry doping can also further simplify the manufacturing process for catalytic adsorbents of the present invention. It is preferred because it eliminates the drying need of preparing doped carbonaceous feedstock for activation.

The final concentration of the halide salt in catalytic adsorbent is determined as in the prior embodiment (i.e. the ratio of the dopant to activated carbon is predetermined in order to determine the concentration of the salt solution), except that in this embodiment, the loss of weight of carbonaceous materials due to combustion in the reaction chamber must be taken into account. One can therefore determine the concentration based on the yield of the final product to account for the weight loss due to activation.

While the halide salts are essential for sufficient mercury removal, excess halide salt may not be desirable and incurs additional cost of manufacture. It has been found that very good catalytic adsorbents of the present invention can be made with halide salt to coal ratio of about 1:1000 (by weight).

As illustrated in FIG. 1, carbonaceous feedstock 16 is injected into reaction chamber 10. The carbonaceous feedstock 16 is not yet activated and can be selected from various types of feedstock such as coal or biomass materials. While not to be construed as limiting, coals suitable for use in the present invention include, but are not limited to, lignite, sub-bituminous coal, bituminous coal or anthracite. The feedstock can be prepulverized to an appropriate size, for example from about 5-200 microns.

The carbonaceous feedstock 16 can be premixed by dry mixing or presoaking with a solution containing the desired halide salt as discussed above prior to injection into reaction chamber 10 with a solution containing the desired halide salt. In the presoaking embodiment, the solution can be formed from water or ethanol, although water may be preferred.

Activating gases 12 and 14 (e.g., air 12 and steam 14) are injected into reaction chamber 10 simultaneous with or nearly simultaneous with carbonaceous feedstock 16. Preferably, the steam is preheated and is injected at a temperature of about 1800° F. Some of the feedstock (such as lignite) is more reactive to oxygen and to improve activated carbon yield, activating gases could also be steam and/or nitrogen only. At very high temperatures such as 2000° F., water is able to react with carbon and become an oxygen source for the surface of the activated carbon. Activating gas can also include a mixture of $O_2$, $N_2$, $H_2O$, $CO_2$, CO and the composition of the mixture can be used to adjust the redox power of the gas mixture to satisfy the requirements of the feedstock.

Reaction chamber 10 may be selected from a variety of reactors such as single batch reactors where the feedstock is fluidized or in layers (such as being suspended on a filter media), and reactant gases pass through the feedstock (e.g, a tube furnace) or continuous reactors whereupon the gas temperature, composition and feedstock residence time can be controlled for optimal conditions (e.g., a fluidized bed reactor). The feedstock can be fluidized by activating gas or a fluidizing device such a Plow Mixer, available from Scott Equipment Company (for continuous processing).

Heat for reaction chamber 10 can be provided by from various sources, for example, the reaction chamber can be electrically heated or heated by a flame. Alternatively or in addition to such heat, reaction chamber 10 may be heated from the heat of reaction between the feedstock and air. It will be appreciated by those skilled in the art that the desired temperature within the reaction chamber depends on several factors, including stoichiometric ratio of oxygen or oxidizing gases to feedstock, contact time and reactivity of the feedstock. The heat may be provided from any source so long as it is sufficient to generate flue gas 18 and adsorbent 19. Typically, the temperature within the furnace will be between about 1450-2700° F., and more preferably between about 1650-2200° F. When the stochiometric ratio of oxygen to feedstock is greater than one, the contact time between the oxidizing gas and the feedstock becomes more significant because more of the feedstock potentially can be consumed and therefore impact product yield. When the stoichiometric ratio is less than one, the contact time will be less critical.

The residence time of the carbonaceous feedstock 16, reactive activating gases (such as air 12 and steam 14) within reaction chamber 10 is long enough such that flue gas 18 and adsorbent 19 are generated within chamber 10. The residence time of the carbon is independent of the gas and can be independently controlled. This can be significant because sufficient time is necessary to devolatilize and partially oxidize the feedstock. While the residence time is short, it is important that it be long enough to adequately activate the carbon. In some embodiments, the residence time may be on the order of minutes, but it can also be as short as milliseconds. It will be appreciated that if the residence time is too long or there is too much oxygen or steam, adsorbent yield will be negatively impacted.

Adsorbent 19 is removed from reaction chamber 10 and is ready for use as a mercury removal adsorbent from flue gas streams at elevated temperatures. Flue gas 18 typically includes combustion gases such as $CO_2$, CO, $N_2$ and $H_2O$. Any unreacted, partially combusted (e.g., CO) or volatile gases in gas stream 18 can be further combusted.

Yet another alternative embodiment for manufacturing catalytic adsorbents for use in accordance with the present invention can be found in commonly owned U.S. patent application Ser. No. 11/078,517, entitled "Production of Activated Char Using Hot Gas" to Bool et al., filed on Mar. 14, 2005 and commonly owned U.S. patent application Ser. No. 11/224,590, entitled "Production of Activated Char Using Hot Gas" to Bool et al., filed on even date herewith, both of which are incorporated herein in their entirety by reference.

In this embodiment, the feedstock is presoaked with an aqueous or ethanol solution as discussed above. The presoaked feedstock is then treated to produce activated char as discussed in commonly owned U.S. patent application Ser. Nos. 11/078,517 and 11/224,590, both entitled "Production of Activated Char Using Hot Gas".

Catalytic adsorbents of the present invention can also be formed by dry mixing a prepulverized raw carbonaceous material with a halide salt powder. In this embodiment, the raw carbonaceous material and halide salt powder are mixed together in dry form. The mixture can then be injected as shown in commonly owned U.S. patent application Ser. Nos. 11/078,517 and 11/224,590, both entitled "Production of Activated Char Using Hot Gas". The temperature within the reaction zone will be at or above the melting point of the halide salt such that the halide salt melts and wets the surface of the carbonaceous material. Consequently, the salt can be dispersed in the carbonaceous material.

Figure 2:
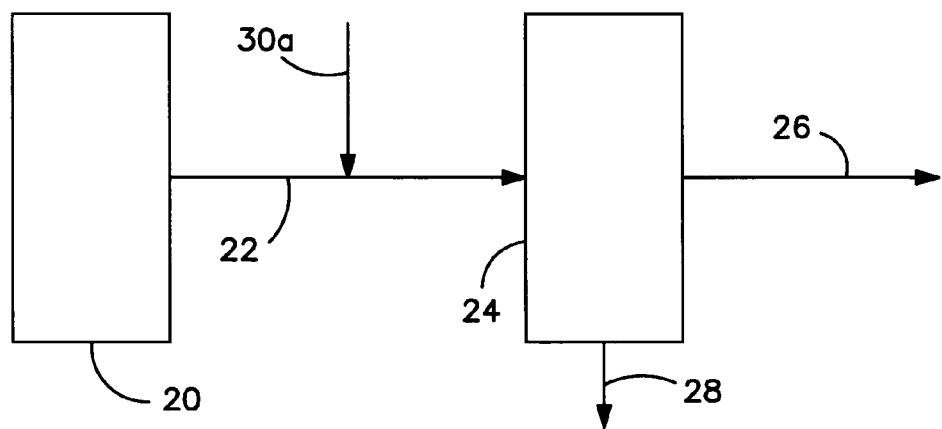
FIG. 2 illustrates a method of using the catalytic adsorbents in accordance with the present invention.
Figure 3:
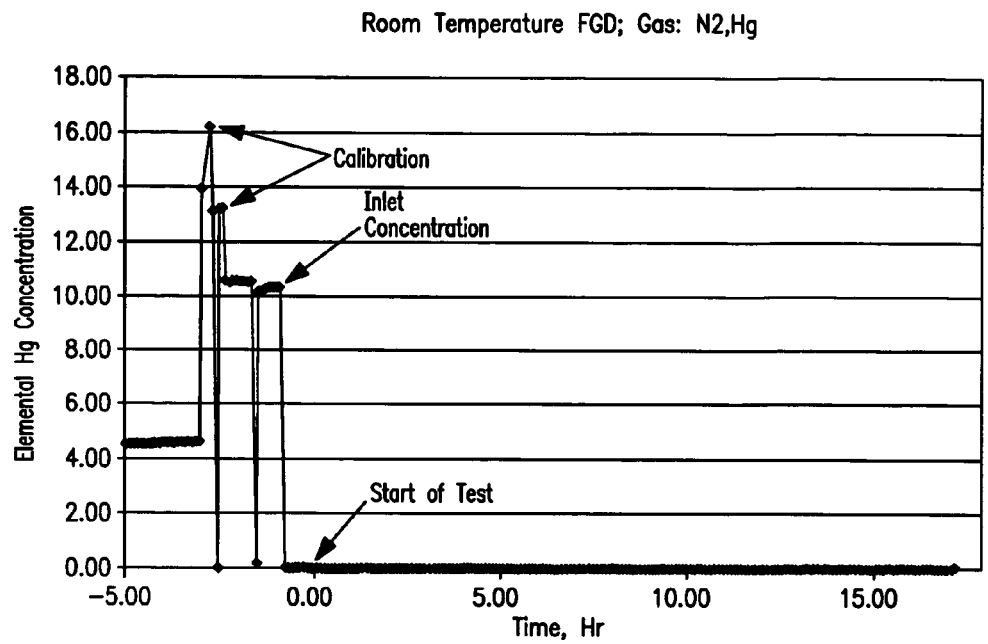
FIGS. 3-6 illustrate graphs relating to Example 1.
Figure 4:
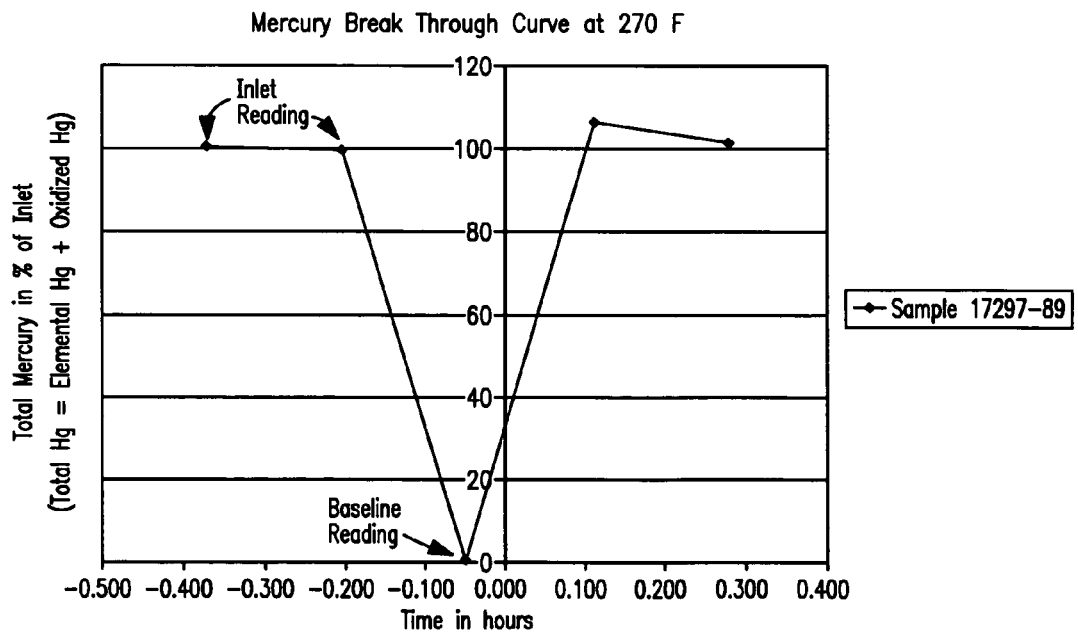
Figure 5:
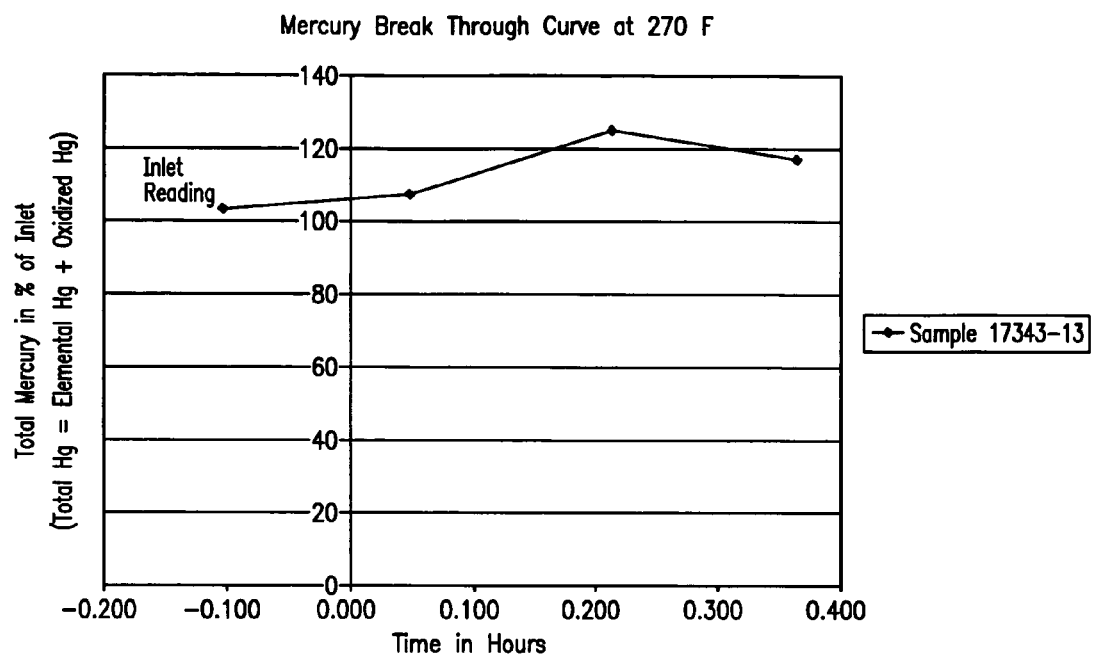
Figure 6:
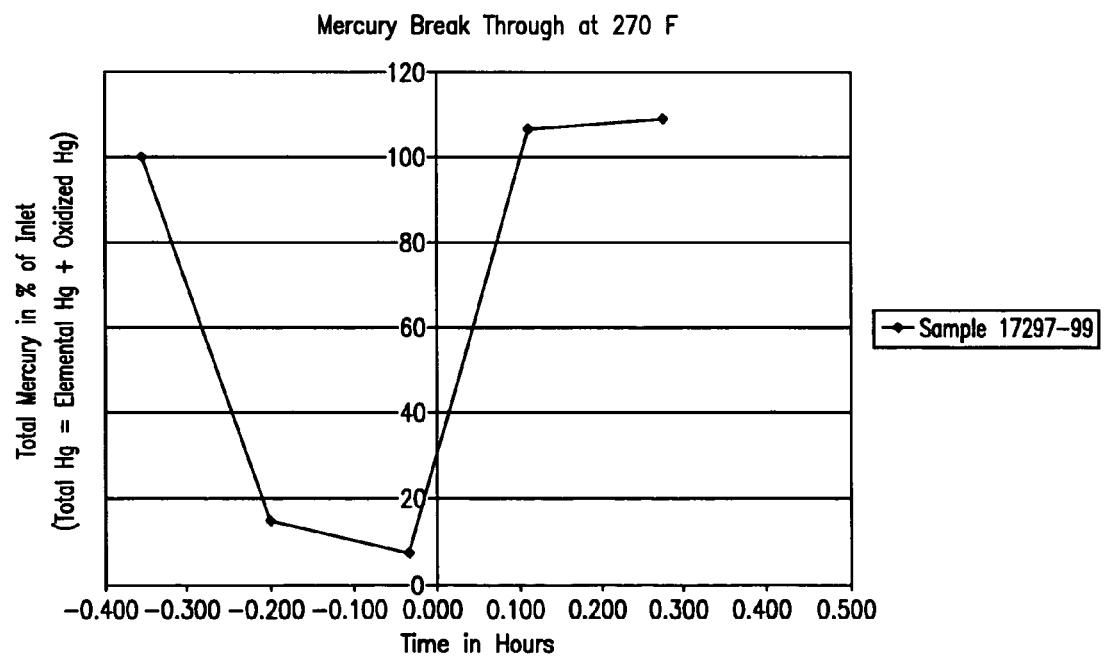
Figure 7:
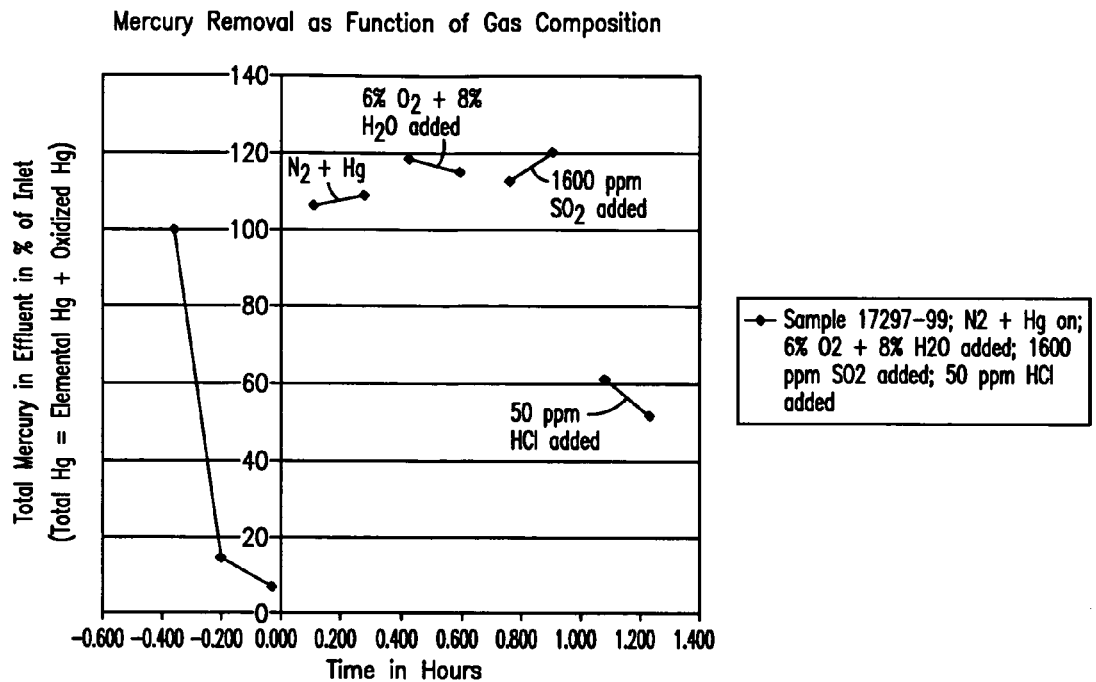
FIGS. 7-12 illustrate graphs relating to Example 2.
Figure 8:
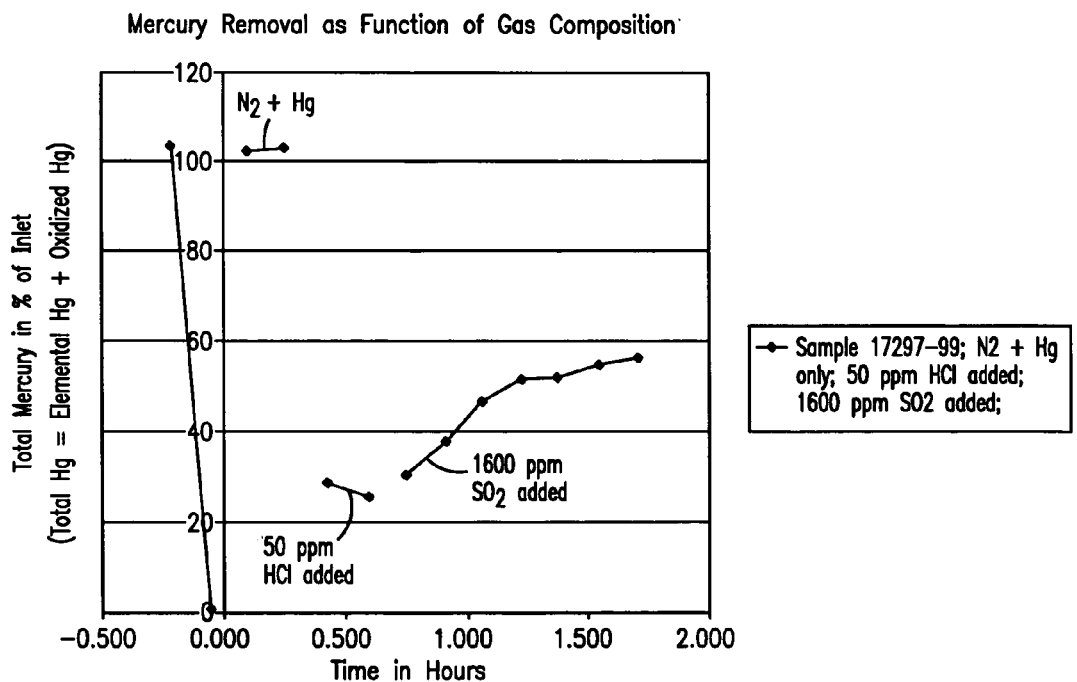
Figure 9:
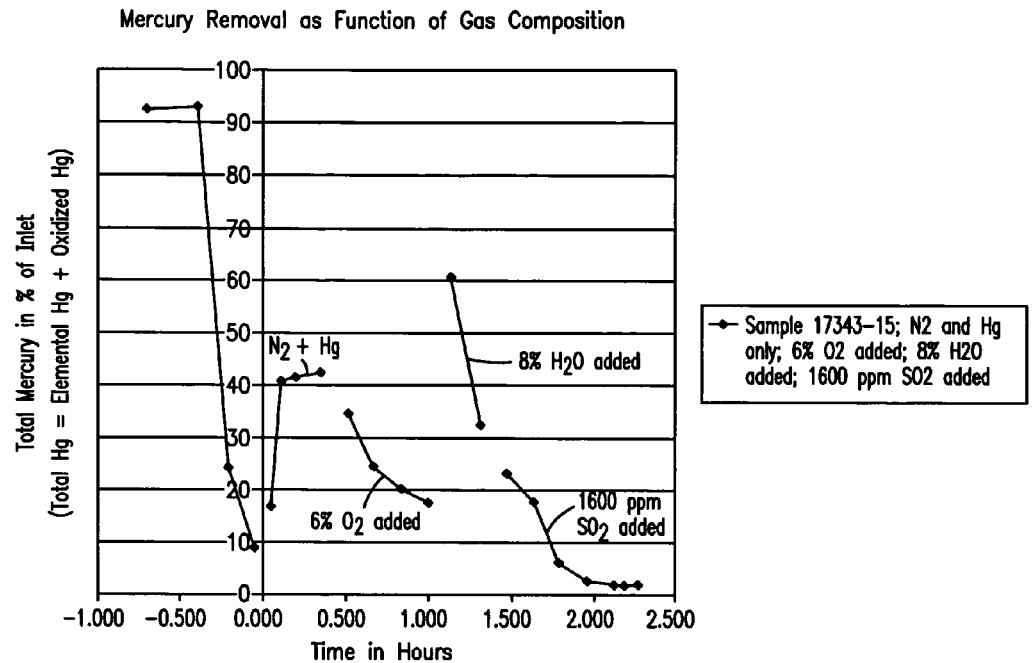
Figure 10:
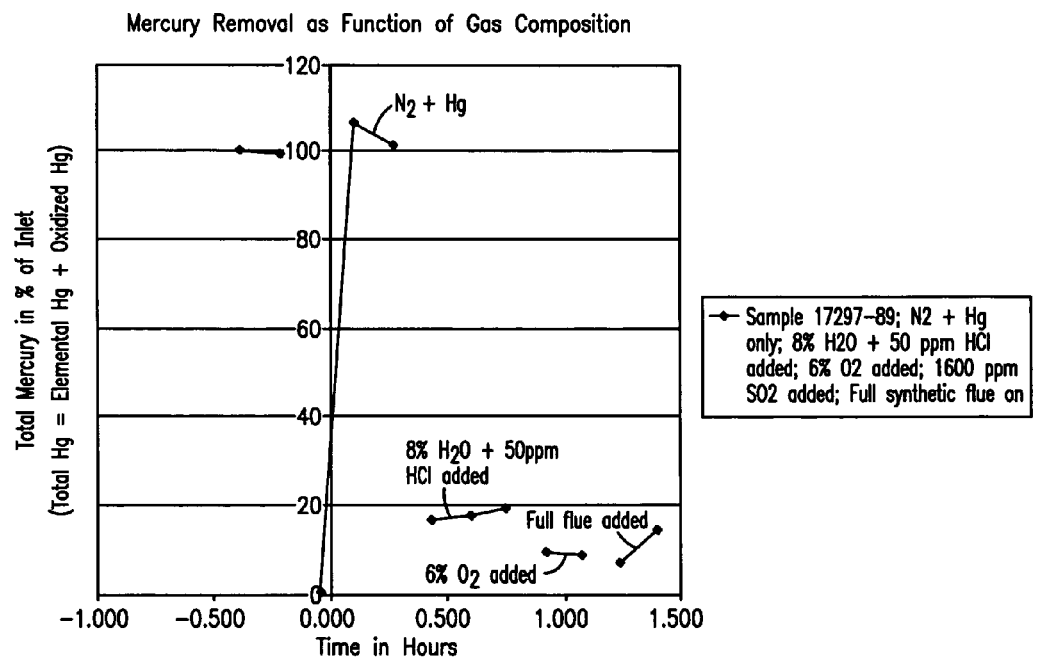
Figure 11:
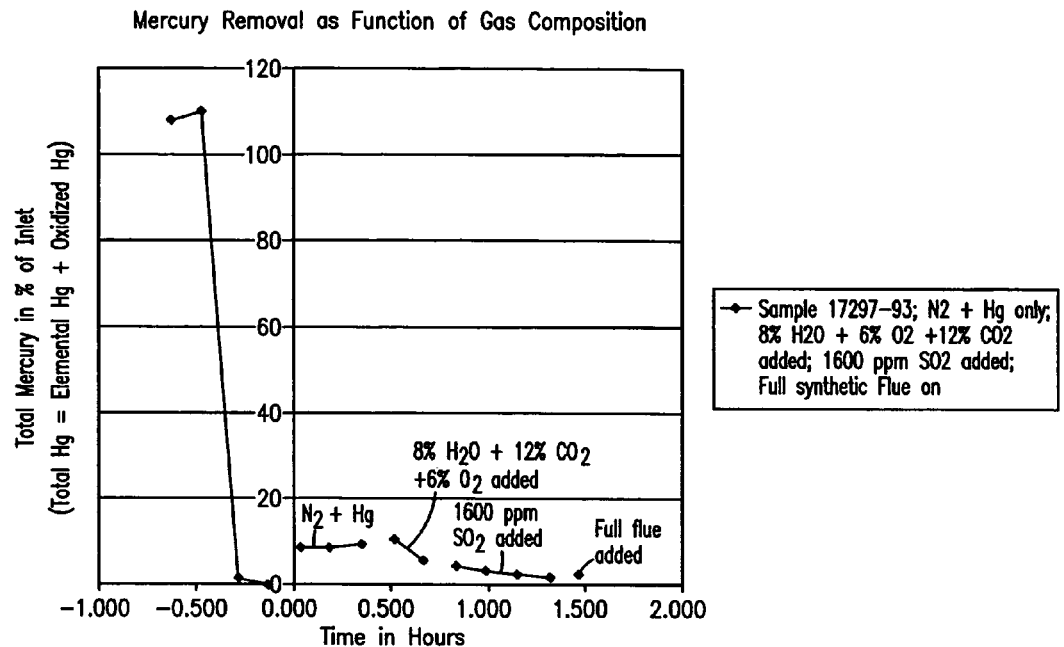
Figure 12:
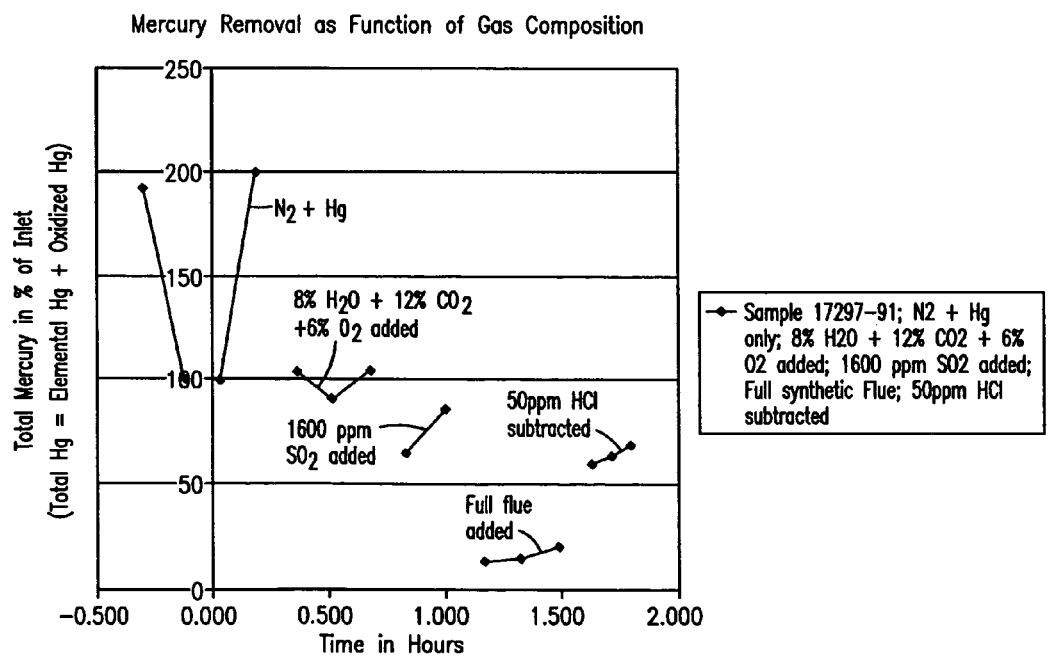

Referring now to FIG. 2, an exemplary system for using the catalytic adsorbents of the present invention is shown. Flue gas 22 is formed as a result of combustion in a furnace or boiler 20. While flue gas 22 can vary in composition and temperature, a model composition can include: 6% $O_2$, 12% $CO_2$, 8% $H_2O$, 1600 ppm $SO_2$, 400 ppm NO, 50 ppm HCl, 20 ppm $NO_2$, and 12 μg/m³ elemental Hg and after going through various heat exchangers, before discharge into air, it can be in the temperature range of about 200-570° F. Catalytic adsorbent 30a, which can be formed from any of the methods described hereinabove, can be injected upstream of particulate collection device (PCD) 24. Particulate collection device 24 is typically a baghouse or electrostatic precipitators (ESPs). Adsorbent 30a is injected into flue gas stream 22 upstream of PCD 24 such that there is sufficient residence time for the catalytic adsorbent to capture and remove mercury from flue gas 22.

Particulates and adsorbent containing mercury are removed from PCD 24 by stream 28. Flue gas 26 thus contains less mercury than flue gas 22 and may be sent to the stack.

In some embodiments, it may be desirable to inject the catalytic adsorbent into the flue gas downstream of the PCD. Such processes are currently being investigated by others.

As discussed above, it is believed that the catalytic adsorbents of the present invention will perform well for mercury removal from flue gas streams at elevated temperatures given the dispersed salts on the surface of the PAC.

EXAMPLES

As will be seen hereinbelow, physical adsorption of PAC at about 270° F. is not sufficient to retain elementary mercury without HCl as a promoter. In contrast, doped PAC function well without HCl; however, the presence of HCl, $O_2$ and/or $SO_2$ function as promoters for a doped PAC.

In some examples, doped PAC were prepared by treating three types of commercially available PAC. In other examples, doped PAC was prepared by activation of halide salt treated coal.

The first commercial PAC used is FGD carbon, available from Norit America, Inc. It is made from Texas lignite coal and contains about 30 weight percent ashes. In powder form, it is widely tested and accepted as a bench mark for activated carbon for mercury removal from flue gas. The second PAC was ashless activated carbon available from Carbon Resource, Inc. It is typically made from purified petroleum pitch and contains a trace amount of ash. It is generally sold in bead form. For mercury removal in the following examples, it was ground, sieved and the −400 mesh portion was used. The third PAC that was used was activated carbon fiber ACF-1300/200, also available from Carbon Resources, Inc. It is made from rayon and typically received in cloth form. This material was ground and screened through 400 mesh sieve before use.

To prepare halide salt doped PAC from coal, coal was soaked in an aqueous or ethanol halide salt solution or the coal and salt were ground together in a mortar with a pestle. The doped coals were activated in a stream of oxygen, nitrogen and steam in temperature range of about 1800° F. to about 2070° F.

It was found that different coals respond to activating gas differently and to considerably different degrees. For example, lignite from Beulah, N. Dak. is easy to oxidize and can give lower yield of activated carbon than the subbituminous coal from Powder River Basin, Wyo. (PRB). This demonstrates that different activation conditions can be necessary for different feedstock.

Different halide salts as well as a wide range of dopant levels were considered. It was unexpected that doping would work well at ratios as low as 1:1000 (dopant to coal); yet, the results were favorable compared to activated carbon (not unactivated coal) doped with 7-15% halides.

Two tests were used to evaluate the adsorbents: a fixed bed test and a residence chamber test. In the fixed bed test, the fixed bed consisted of 150 mg adsorbent supported on a quartz filter of about 63.5 mm in diameter. The details of the test setup are described in papers published by EERC, as published for example at the DOE Mercury Control Technology R&D Program Review Meeting on Aug. 12-13, 2003 at Pittsburgh, Pa. Gas streams containing mercury as well as components of flue gas were passed through the thin bed. The break through of mercury was monitored and spent adsorption beds were collected and analyzed.

In the residence time chamber test, a slip stream from power plants at Pleasant Prairie, Wis. and Pueblo, Colo. were made to pass through chambers of different length. Adsorbent was injected at one end of the chamber to flight with the flue gas stream. At the other end of the chamber, the adsorbent was separated from the flue gas stream and the cleaned flue gas was analyzed for Hg content to determine the efficiency of the adsorbent. The chamber length was used to determine the contact time between the flue gas and the adsorbent. In "Inflight Adsorption", strong adsorption affinity and fast adsorption kinetics are necessary for high mercury removal efficiency. Details of the residence time chamber apparatus (designed by the Electric Power Research Institute (EPRI)) can be found in published papers (see e.g., "Assessment of Low Cost Novel Sorbents for Coal Fired Power Plant Mercury Control", Combined Power Plant Air Pollutant Control Mega Symposium (Washington, D.C., Aug. 30-Sep. 2, 2004).

Example 1

This example demonstrates that at room temperature, undoped PAC is a good adsorbent for elemental mercury and a promoter would appear to provide no additional benefit. At 270° F., however, physical adsorption is overwhelmed by kinetic energy and adsorption by undoped PAC and without a promoter is inadequate.

Fixed bed tests were conducted on four samples in a stream which contained nitrogen and about 13 μg/m³ of elemental mercury. The tests conditions and results are summarized in Table 1 and FIGS. 3-6. The undoped FGD carbon sample was tested at room temperature and achieved 100% mercury removal for more than 15 hours with no sign of mercury breakthrough. For samples tested at 270° F., all three types of activated carbon reached almost 100% breakthrough immediately (0% removal).

TABLE 1

| Sample # | Sample Name | Sample treatment | Test Temp | Test gases composition and sequence | Comments on Test Results |
|---|---|---|---|---|---|
| | FGD carbon | As received | 72 F. | $N_2$ + Hg | 100% Hg removal for 15 hrs; no any sign of breakthrough |
| 17297-89 | FGD carbon | Vacuum activated at 1100 F. | 270 F. | $N_2$ + Hg | Breakthrough occurred immediately |
| 17343-13 | Carbon fiber | 6 N HCl extraction and heating at 1800 F. in $N_2$ | 270 F. | $N_2$ + Hg | Breakthrough occurred immediately. |
| 17297-99 | Ashless carbon | 6 N HCl extraction and heating at 1800 F. in $N_2$ | 270 F. | $N_2$ + Hg | Breakthrough occurred immediately |

6 N HCl extraction was used in Sample Numbers 17343-13 and 17297-99 to remove any trace ashes. Heating in $N_2$ at 1800° F. is intended to remove oxidizing species on the commercially obtained PAC, so that oxygen species can be introduced at a chosen time. Neither treatment changed the mercury adsorption behavior of the PAC. These samples were exposed to test gas containing oxygen as well as nitrogen and mercury at 270° F. The data are reported in the examples below. Oxygen in the test gas alone is not sufficient for the PAC to adsorb mercury.

Example 2

This example demonstrates how halide salts as a dopant alter the flue gas, mercury and carbon interaction so as to promote mercury adsorption from the flue gas stream. In this Example, thin fixed beds of PAC samples were exposed to different gas mixtures in sequence. All experiments started with nitrogen and mercury (about 13 μgm/cubic meter). Other components of the flue were added into the stream sequentially or in sequential combination toward a model composition of synthetic flue gas, which is typified as: 6% $O_2$, 12% $CO_2$, 8% $H_2O$, 1600 ppm $SO_2$, 400 ppm NO, 20 ppm $NO_2$, 50 ppm HCl, 12-14 μg/m³ Hg, with the balance being $N_2$.

Two type of PAC (ashless and FGD) and three dopants (KBr, NaBr, and NaCl) were used in the following experiments. Detail of the experiments and results are summarized in Table 2. The breakthrough curves are given in FIGS. 7-12. The results demonstrate that the composition of gases play an important role in mercury adsorption.

TABLE 2

| Sample # | Sample Name | Sample Description | Test gases composition and sequence | Comments on Test Results |
|---|---|---|---|---|
| 17297-99 | Ashless carbon | 6 N HCl extraction and heating at 1800 F. in $N_2$ | $N_2$ + Hg; 6% $O_2$ + 8% $H_2O$ added; 3. 1600 ppm SO2 added; 4. 50 ppm HCl added | Removed Hg only after HCl was added to the test gas |
| 17297-99 | Ashless carbon | 6 N HCl extraction and heating at 1800 F. in $N_2$ | $N_2$ +; Hg; 50 ppm HCl added; 3. 1600 ppm $SO_2$ added | HCl promoted Hg adsorption, $SO_2$ caused decline of Hg removal |
| 17343-15 | KBr doped Ashless carbon | 15:100 ratio of KBr:Carbon | $N_2$ + Hg; 6% $O_2$ added; 8% $H_2O$ added; 4. 1600 ppm $SO_2$ added | Adsorbed Hg in $N_2$ stream. Both $O_2$ and $SO_2$ promoted Hg removal |
| 17297-89 | FGD carbon | Vacuum activated at 1100° F. | $N_2$ + Hg; 8% $H_2O$ + 50 ppm HCl added; 6% $O_2$ added; 4. Full Flue added | Removed Hg only after HCl was added to the test gas |
| 17297-93 | NaBr doped FGD | 15:100 ratio of NaBr:Carbon | $N_2$ + Hg; 8% $H_2O$ + 12% $CO_2$ + 6% $O_2$ added; 1600 ppm $SO_2$ added; 4. Full Flue added | Adsorbed Hg in $N_2$ stream. Both $O_2$ and $SO_2$ promoted Hg removal |

TABLE 2-continued

| Sample # | Sample Name | Sample Description | Test gases composition and sequence | Comments on Test Results |
|---|---|---|---|---|
| 17297-91 | NaCl doped FGD | 15:100 ratio of NaCl:Carbon | $N_2$ + Hg; 2. +8% $H_2O$ + 12% $CO_2$ + 6% $O_2$ added; 1600 ppm $SO_2$ added; Full Flue added; 5. 50 ppm HCl subtracted | $CO_2$ and $SO_2$ were weak promoters. The presence of HCl was important for Hg removal |

Example 3

This example demonstrates that a physical adsorbent such as silica gel, doped with KBr, did not remove mercury from the flue gas.

Figure 13:
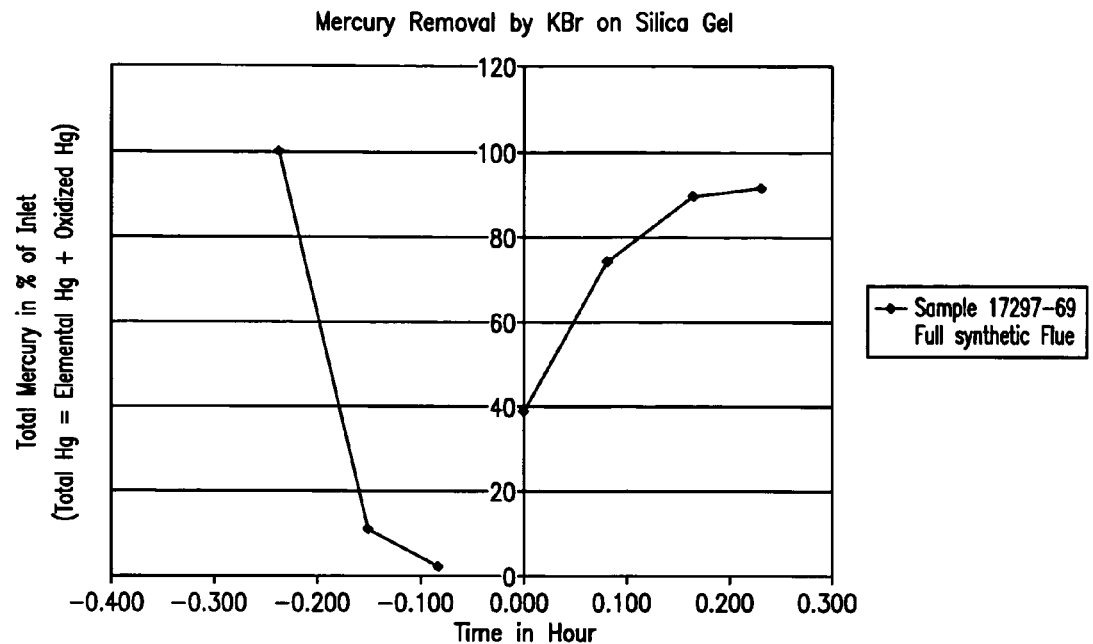
FIG. 13 illustrates a graph relating to Example 3.
Figure 14:
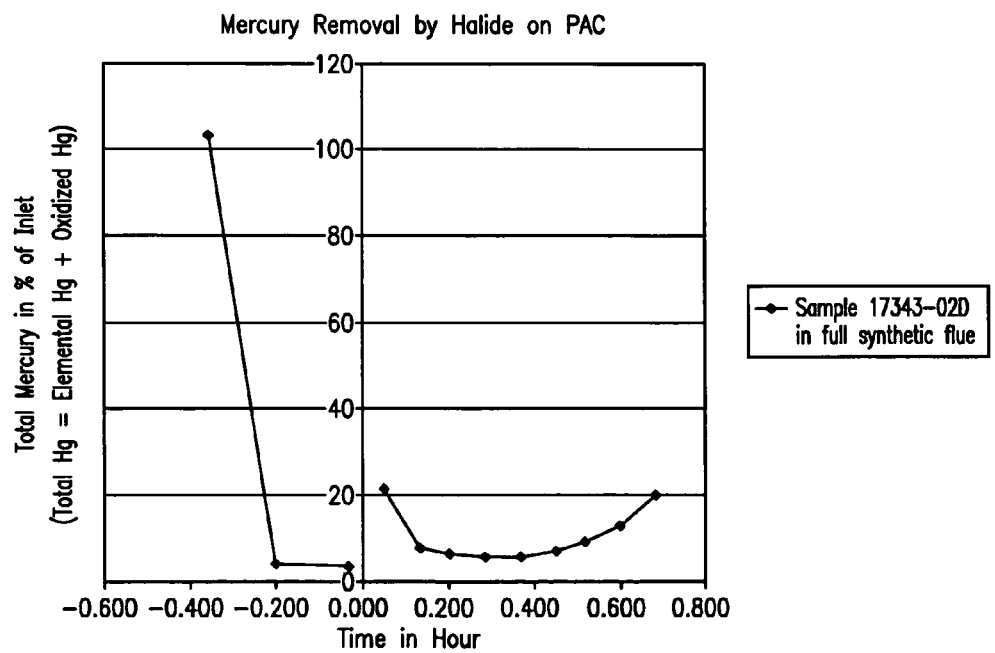
FIGS. 14-20 illustrate graphs relating to Example 4.
Figure 15:
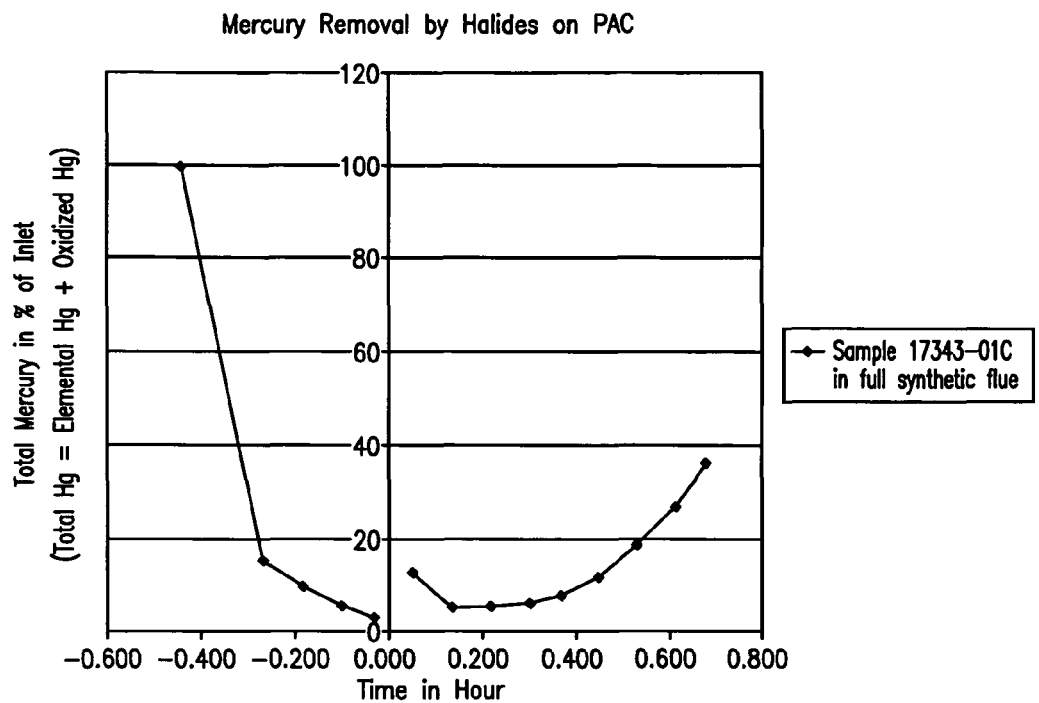
Figure 16:
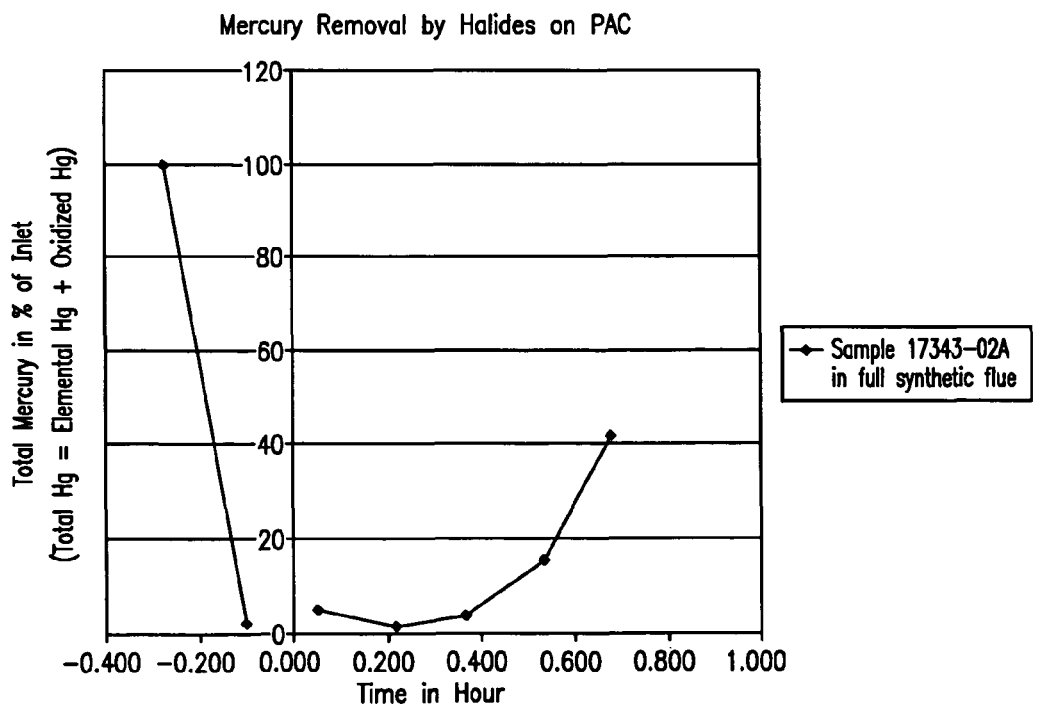
Figure 17:
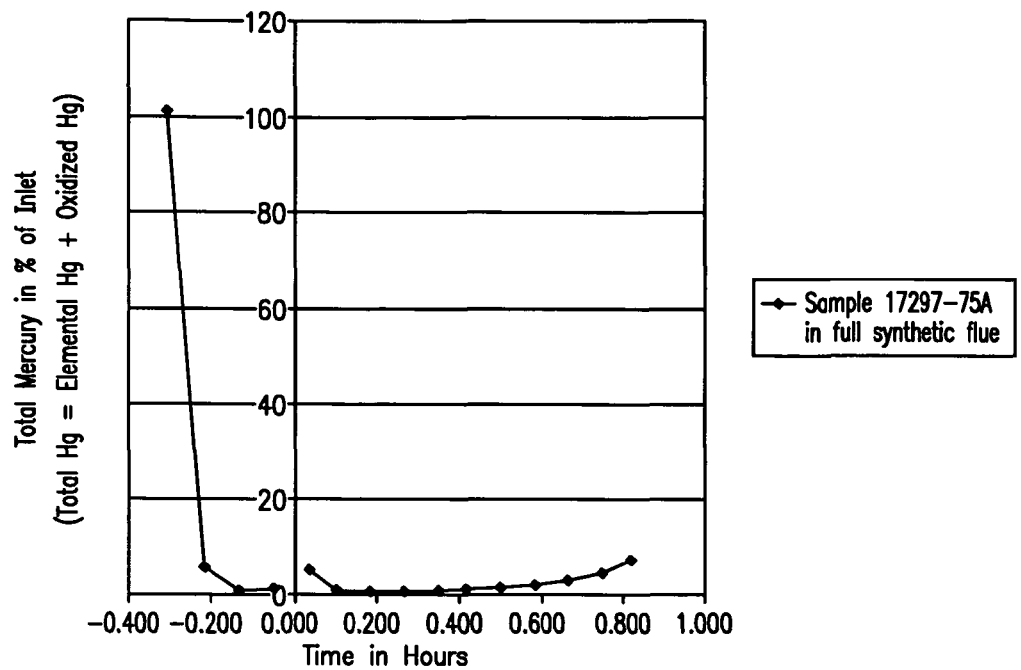
Figure 18:
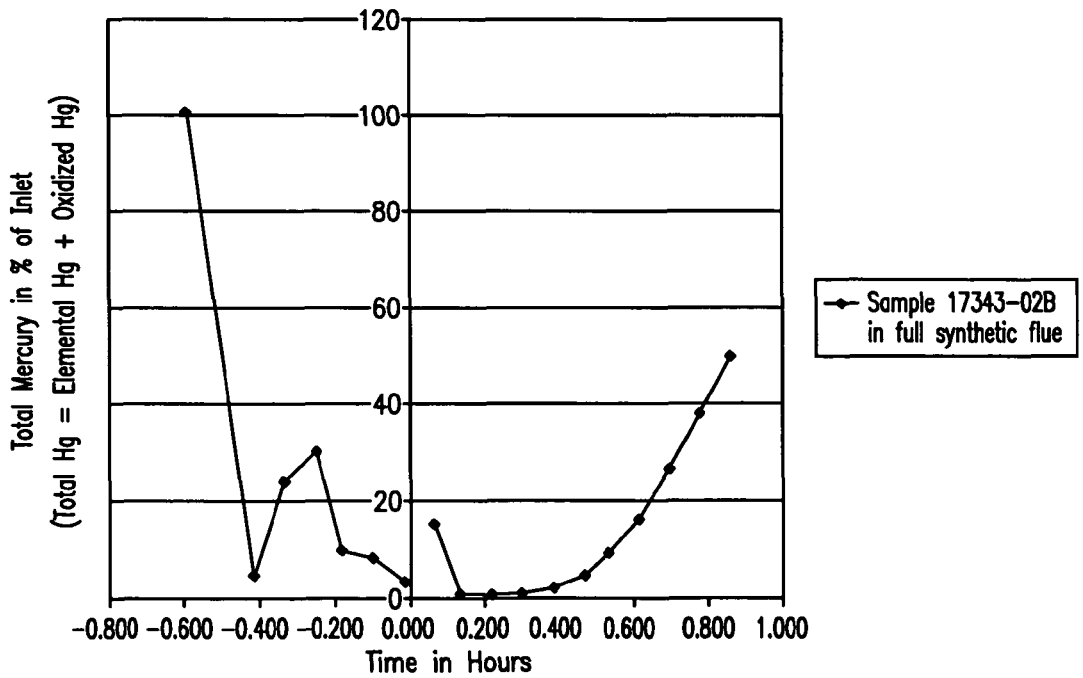
Figure 19:
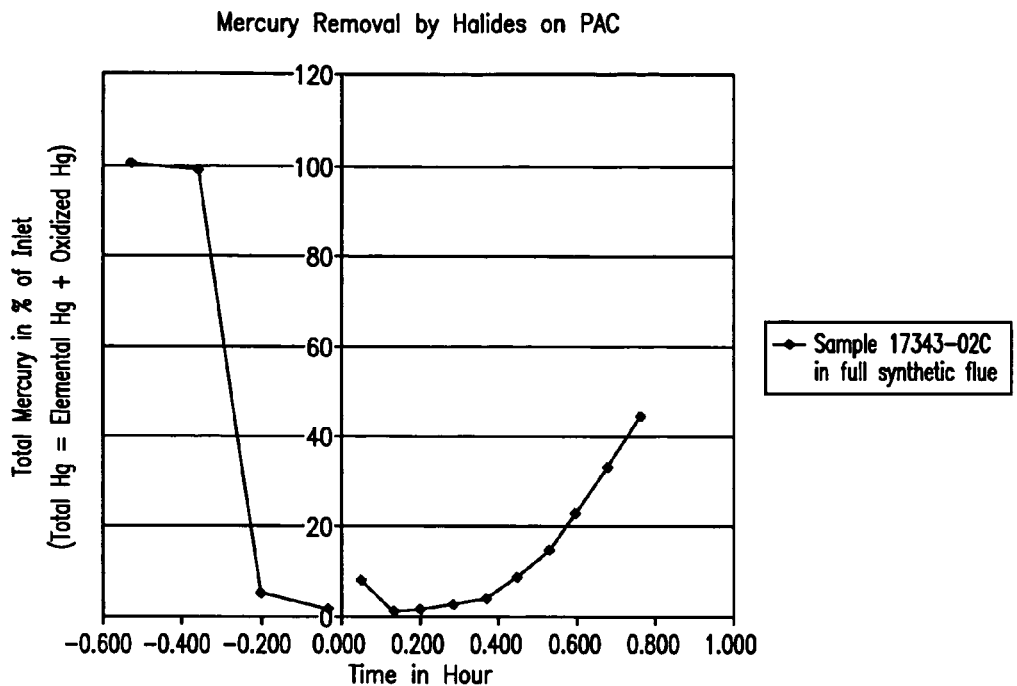
Figure 20:
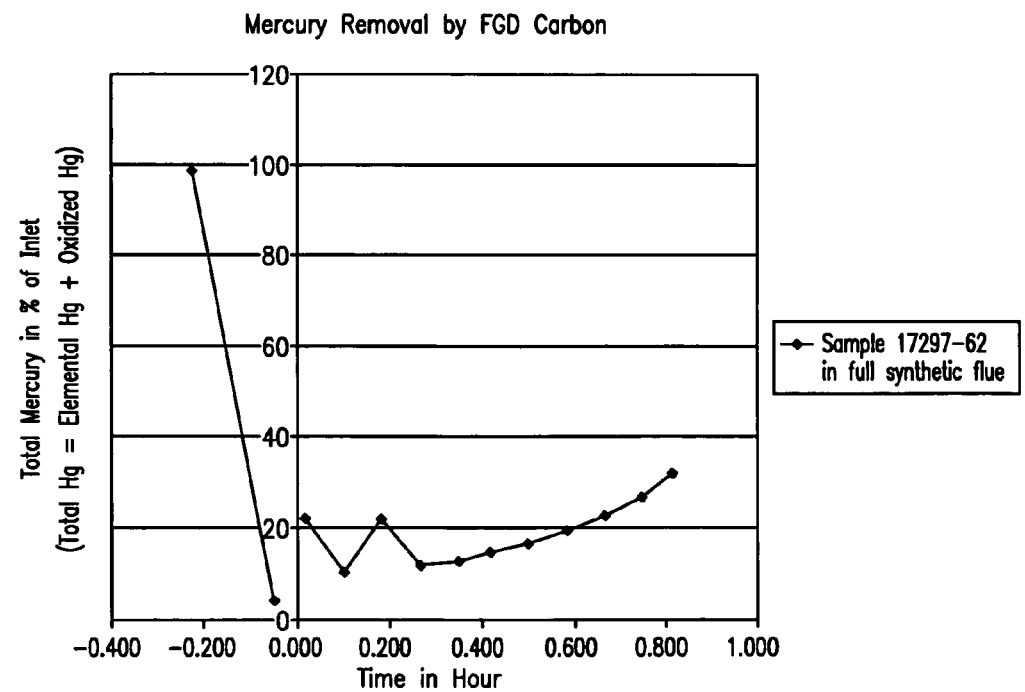

The same thin fixed bed method as in Examples 1 and 2 was used in this Example. The details of sample preparation, test conditions and results are given in Table 3 and FIG. 13.

TABLE 3

| Sample # | Sample Name | Sample Description | Test gases composition and sequence | Comments on Test Results |
|---|---|---|---|---|
| 17297-69 | KBr doped silica gel | The weight ratio of KBr:Silica gel = 15:100 | 1. $O_2$ 6% + $CO_2$ 12% + $H_2O$ 8% + $SO_2$ 1600 ppm + NO 400 ppm + HCl 50 ppm + $NO_2$ 20 ppm + Hg 14 micro gram + $N_2$ (full synthetic flue) | The concentration of Hg reduction was less than 10%. |

Example 4

This example analyzed the effectiveness of various halide salts as dopants. Doped ashless carbons were tested by thin fixed bed methods as in Examples 1-3 in synthetic flue. The results are compared with undoped FGD.

The thin fixed bed test is to simulate the function of a bag house in a power plant. The efficiency of adsorbent is analyzed by the percent of mercury removal from the flue gas.

Both thin fixed bed and inflight adsorption are extremely demanding on adsorption kinetics, but between the two, the thin fixed bed has more emphasis on adsorption capacity. There is an opportunity for all molecules in the stream in fraction of a second to pass mm thick, densely packed adsorbent powder. But, the adsorbent remains available to mercury until it is removed from the stream.

All doped samples reached higher mercury removal than undoped FGD carbon. The results are given below in Table 4 below. The breakthrough curves are shown in FIGS. 14-20.

TABLE 4

| Sample # | Sample Name | Sample Description | Test gases composition and sequence | Comments on Test Results |
|---|---|---|---|---|
| 17343-02D | KCl doped ashless carbon | 15:100 ratio of KCl:Carbon | 1. $O_2$ 6% + $CO_2$ 12% + $H_2O$ 8% + SO2 1600 ppm + NO 400 ppm + HCl 50 ppm + $NO_2$ 20 ppm + Hg 14 μg/m$^3$ + $N_2$ (full flue) | Best removal at about 95% level |
| 17343-01C | NaCl doped ashless carbon | 15:100 ratio of NaCl:Carbon | 1. $O_2$ 6% + $CO_2$ 12% + $H_2O$ 8% + SO2 1600 ppm + NO 400 ppm + HCl 50 ppm + $NO_2$ 20 ppm + Hg 14 μg/m$^3$ + $N_2$ (full flue) | Best removal at about 93% level |
| 17343-02A | NaBr doped ashless carbon | 15:100 ratio of NaBr:Carbon | 1. $O_2$ 6% + $CO_2$ 12% + $H_2O$ 8% + SO2 1600 ppm + NO 400 ppm + HCl 50 ppm + $NO_2$ 20 ppm + Hg 14 μg/m$^3$ + $N_2$ (full flue) | Best removal at about 98% level |

TABLE 4-continued

| Sample # | Sample Name | Sample Description | Test gases composition and sequence | Comments on Test Results |
|---|---|---|---|---|
| 17297-75A | KBr:Carbon = 15:100 | 15:100 ratio of KBr:Carbon | 1. $O_2$ 6% + $CO_2$ 12% + $H_2O$ 8% + SO2 1600 ppm + NO 400 ppm + HCl 50 ppm + $NO_2$ 20 ppm + Hg 14 $\mu g/m^3$ + $N_2$ (full flue) | Best removal at about 100% level |
| 17343-02B | $CaBr_2$ doped ashless carbon | 15:100 ratio of $CaBr_2$:Carbon | 1. $O_2$ 6% + $CO_2$ 12% + $H_2O$ 8% + SO2 1600 ppm + NO 400 ppm + HCl 50 ppm + $NO_2$ 20 ppm + Hg 14 $\mu g/m^3$ + $N_2$ (full flue) | Best removal at about 100% level |
| 17343-02C | $MgBr_2$ doped ashless carbon | 15:100 ratio of $MgBr_2$:Carbon | 1. $O_2$ 6% + $CO_2$ 12% + $H_2O$ 8% + SO2 1600 ppm + NO 400 ppm + HCl 50 ppm + $NO_2$ 20 ppm + Hg 14 $\mu g/m^3$ + $N_2$ (full flue) | Best removal at about 95% level |
| 17297-62 | FGD carbon | From Norit Amercia, a reference | 1. $O_2$ 6% + $CO_2$ 12% + $H_2O$ 8% + SO2 1600 ppm + NO 400 ppm + HCl 50 ppm + $NO_2$ 20 ppm + Hg 14 $\mu g/m^3$ + $N_2$ (full flue) | Best removal at about 90% level |

Example 5

This example used a residence time chamber test to demonstrate the effectiveness of bromide salt doped PAC in an "in flight adsorption" and the quality of PAC made by direct activation of bromide salt doped coal.

Residence time chamber test: The residence time chamber used in this Example was an 8-inch diameter tube setup as discussed above. It was developed by Electric Power Research Institute (EPRI). A slip stream of 30 acfm flue was taken out from a coal burning boiler duct for flow through this tube. Adsorbent is injected at one end of the tube. At each of the middle section and exit end of this tube, there are outlet sampling tubes to allow measurement at two different residence times. The mercury concentrations were measured at the inlet as well as the sampling outlets to determine the mercury removal efficiency of the adsorbents.

The mercury atom must collide with an adsorbent particle in order to be adsorbed. For the residence chamber test, adsorbent particles can have a chance to collide with mercury molecules only inside the chamber while flighting. The residence time is short (about 2-4 seconds), and the accessibility of adsorbate to adsorbent is extremely limited. At the exit of the chamber, the capacity of adsorbent is not exhausted. The fact that a high percentage of mercury been removed is evidence of fast kinetics and strong adsorption affinity of catalytic adsorbent, in another words collision to a reaction path is very efficient.

The residence time chamber simulates the situation of a plant which has only an electrostatic precipitator (ESP), therefore mercury removal depends on inflight adsorption. Typical inflight time is about 2 seconds. In the example, the sampling outlets allow about 2 and 4 seconds of residence time.

Three groups of adsorbents were tested. The first group of samples were prepared by doping FGD PAC with an aqueous bromide salt solution. The second group of samples were prepared by activation of halide salt doped coal in a tube furnace at 1650° F. to 2000° F. in a stream containing, oxygen, nitrogen and water. The third group of samples were prepared by activation of halide salt doped coal by a burner as in commonly owned U.S. patent application Ser. No. 11/078,517, entitled "Production of Activated Char Using Hot Gas" to Bool et al., filed on Mar. 14, 2005, with or without further steam activation at 1800° F.

Undoped FGD carbon samples were also tested to serve a as reference. The test results are given in Table 5. The percentage of Hg removal is calculated by dividing outlet mercury concentration with the inlet mercury concentration. Since there is no way to determine how much mercury is removed by the cylinder wall, the reported number is the sum of inflight removal plus removal by wall effect.

Adsorbents from all three groups perform better than the commercially available FGD carbon.

TABLE 5

| Sample # | Sample Name | Sample Description | Injection rate lb/mmacf | Temp (° F.) | Inlet Hg $\mu g/Nm^3$ | Outlet Hg 2/4 sec | % Hg Removal (2 sec) | % Hg Removal (4 sec) |
|---|---|---|---|---|---|---|---|---|
| 17297-22 | FGD/KBr | FGD carbon doped with 7:100 ratio of KBr:FGD | 5.8 | 300 | 9 | 1.75/0.9 | 81 | 90 |

TABLE 5-continued

| Sample # | Sample Name | Sample Description | Injection rate lb/mmacf | Temp (° F.) | Inlet Hg µg/Nm$^3$ | Outlet Hg 2/4 sec | % Hg Removal (2 sec) | % Hg Removal (4 sec) |
|---|---|---|---|---|---|---|---|---|
| 17297-23 | FGD/ KBr/ CuBr2 | FGD carbon with 6:1:100 ratio of KBr:CuBr$_2$:FGD | 5.7 | 300 | 8.7 | 1.3/0.7 | 85 | 92 |
|  | FGD | No doping | 6 | 300 | 6.4 | 3.3/2.8 | 48 | 56 |
| 17343-76 | Activated PRB coal predoped with CaBr2 | 7:100 ratio of CaBr$_2$:Coal. Activated in tube furnace | 6 | 300 | 10.3 | 3.0/2.0 | 71 | 80 |
| 17343-77 | Activated PRB coal predoped with NaBr | 7:100 ratio of NaBr:coal. Activated in tube furnace | 6 | 300 | 9.5 | 2.1/1.5 | 78 | 84 |
| 17343-83B | Activated PRB coal predoped with CaBr2 | 5:100 ratio of (CaBr$_2$ ½H$_2$O):coal. Activated In tube furnace | 6 | 300 | 9.9 | 2.8/1.8 | 72 | 82 |
| 78B | Activated PRB coal predoped with KBr | 7:100 ratio of KBr:coal. Activated in burner | 6 | 300 | 9.8 | 3.5/2.2 | 64 | 78 |
| 42A-15-1000 | Activated PRB coal predoped with KBr | 7:100 ratio of KBr:coal. Activated in burner, then steamed at 1800 F. (15 min) | 6 | 300 | 9 | 1.7/1.2 | 81 | 87 |

Example 6

The chemical form of dopant in PAC. Activation of bromide salt doped coal is at a temperature close to 1800-2000° F. This raises the question whether the bromide salt retains its ionic form. Chemical analyses of bromide salt doped coal before and after activation are shown in Table 6. Bromide salt maintains its inert ionic form. This may be particularly advantageous because bromination of carbon can create unknown and undesirable organic bromide compounds. It is therefore desirable to avoid the formation of such compounds.

The data in Table 6 also reveals that after soaking in NaBr solution, there is an ion exchange reaction between the salts in the coal and NaBr. Br ion associates with cations in the coal (coal is a complex mixture) and Na associates with anions in the coal. The new bromide salt is retained better than the new sodium salt by the coal. During evaporation of water, the sodium salt remains in the aqueous phase. When evaporation is complete, some of the sodium salt eventually attaches to the container. In the doped coal, the sodium ion concentration is lower than the bromide. This suggests that attention should be given to maintaining complete homogeneity of dopant levels in wet doping embodiments.

In dry doping by mixing there is no such salt separation is possible therefore, as the data in table 6 show that the sodium ion concentration in the coal is always higher than bromide.

TABLE 6

| Sample # | Sample Name | Sample Description | Ionic bromine mmol/gm | Total bromine mmol/gm | Na mmol/gm |
|---|---|---|---|---|---|
| 17343-85A | NaBr doped PRB coal | NaBr:PRB coal = 5:100 Before activation | 0.43 | 0.48 | 0.17 |
| 17343-85B | 17343-85A after activation | tube furnace at 1800 F., purged with 10% O$_2$, 90% N$_2$ saturated with water vapor at 194 F. | 0.65 | 0.70 | 0.26 |

TABLE 6-continued

| Sample # | Sample Name | Sample Description | Ionic bromine mmol/gm | Total bromine mmol/gm | Na mmol/gm |
|---|---|---|---|---|---|
| 17343-88A | NaBr doped PRB coal | NaBr:PRB coal = 1:100 before activation | 0.09 | 0.08 | 0.03 |
| 17343-88B | 17343-88A after activation | tube furnace at 1800 F., purged with 10% $O_2$, 90% $N_2$ saturated with water vapor at 194 F. | 0.11 | 0.12 | 0.05 |
| 173900-06A | NaBr dry mix doped with PRB coal | NaBr:PRB coal = 1.5:100 before activation | | 0.11 | 0.34 |
| 17390-06B | 17390-06A after activation | Tube furnace at 1958 F. purged with air saturated with water vapor at 212 F. | 0.15 | 0.16 | 0.45 |

Example 7

For wet doping, it is necessary to dry the wet coal prior to activation. Therefore, extra cost associated with this drying step is required. On the other hand, dry mixing even with grinding was expected to be difficult to achieve mixing at the molecular level. To make a high surface area catalytic adsorbent, one would expect molecular level dispersion of the dopant to be important. We set out to resolve this dilemma and unexpectedly found that as the residence chamber data in Table 7 shows, dry mixing yields equal or better adsorbent as wet doping, even at very low dopant level of 0.1 wt %. That suggests that the activation step provides the mechanism to achieve sufficient mixing at the molecular level.

Doping level. Another parameter that needs to be determined is the dopant level. It is desirable to use a dopant level as low as possible. Table 7 gives test results of samples prepared with NaBr to PRB coal ratio of 1.5:100 and 0.1:100. The performance does not suffer even at the 0.1% level.

Dakota (ND) lignite from Buelah, N. Dak. Results in Table 8 show that for producing activated carbon of comparable capability for mercury removal, an activation gas mixture of lower oxidation activity, lower activation temperature, and short activation time can significantly increase the yield of the activation process.

The results of the first two samples show that at 1800° F., water is able to supply oxygen to volatize the carbon and an increase of 5 minutes of activation time can make a large difference in activated carbon yield. A comparison of results of second and third samples shows that air is more potent in volatizing the carbon than water. The results of the fourth sample show that the destruction power of air can be moderated by reducing the activation time. The results of the fifth sample show the moderating effect of lower activation temperature.

TABLE 7

| Sample # | Sample Name | Sample Description | Injection rate lb/mmacf | Temp (° F.) | Inlet Hg µg/Nm3 | Outlet Hg 2/4 sec | % Hg Removal (2 sec) | % Hg Removal (4 sec) |
|---|---|---|---|---|---|---|---|---|
| 17390-06B | Activated PRB predoped with NaBr | Dry doped, NaBr:PRB = 1.5:100; Activation In tube furnace at 1958 F., purged with air (4 liter/min.) bubble through boiling water | 6 | 300 | 7.4 | 0.7/0.4 | 91 | 95 |
| 17390-12A | Activated PRB predoped with NaBr | Wet doped NaBr:PRB = 1.5:100; Activation In tube furnace at 1958 F., purged with air (4 liter/min.) bubble through boiling water | 6 | 300 | 6 | 0.8/0.5 | 87 | 92 |
| 17390-62B | Activated PRB predoped with NaBr | Dry doped, NaBr:PRB = 0.1:100; Activation In tube furnace at 1958 F., purged with air (4 liter/min.) bubble through boiling water | 6 | 300 | 7.4 | 1.0/0.7 | 86 | 91 |

Example 8

Coal reactivity and activation conditions. Activated carbon is a high surface area material with an active functional group on the surface. The reactions between coal and the activation gases facilitate this process. Lignite is known to be reactive. We conducted a set of activation experiments on North These results point out the importance of oxidation power of the activating gas. From pure oxygen to $CO_2$ to CO, one has a wider oxidation power range to choose from than just air and water. These results also point out the advantage of an activation process which has better control of gas composition, temperature and time.

TABLE 8

| Sample # | Formulation | Preparation Conditions | Activation Yield (% of as received coal) | Injection rate lb/mmacf | Temp (° F.) | Inlet Hg μg/Nm3 | Outlet Hg 2/4 sec | % Hg Removal (2 sec) | % Hg Removal (4 sec) |
|---|---|---|---|---|---|---|---|---|---|
| 17390-52B | Dry mix NaBr:ND Lignite = 0.25:100 | 1800 F.; N2 2 liter/min bubbling through boiling water; 20 min. activation time | 16.5 | 6 | 300 | 9 | 1.9/1.2 | 79 | 87 |
| 17390-57B | Dry mix NaBr:ND Lignite = 0.25:100 | 1800 F.; N2 2 liter/min. bubbling through boiling water; 15 min. activation time | 23.3 | 6 | 300 | 8.5 | 1.8/1.2 | 79 | 86 |
| 17390-58B | Dry mix NaBr:ND Lignite = 0.25:100 | 1800 F.; air 2 liter/min. bubbling through boiling water; 15 min. activation time | 17.2 | 6 | 300 | 5.8 | 1.7/1.0 | 71 | 83 |
| 17390-53B | Dry mix NaBr:ND Lignite = 0.25:100 | 1800 F.; air 2 liter/min. bubbling through boiling water; 10 min. activation time | 27.7 | 6 | 300 | 9.5 | 2.6/1.8 | 73 | 81 |
| 17390-60B | Dry mix NaBr:ND Lignite = 0.25:100 | 1650 F.; air 2 liter/min. bubbling through boiling water; 15 min. activation time | 26.1 | 6 | 300 | 7 | 1.3/0.9 | 81 | 87 |

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method of making catalytic adsorbent for use in the adsorption of mercury from flue gas streams at elevated temperatures, comprising:
    wet mixing a carbonaceous feedstock with a halide salt which is NaBr, KBr, or a mixture thereof wherein the carbonaceous feedstock comprises coal;
    drying the mixture of the carbonaceous feedstock and the halide salt;
    injecting the mixed carbonaceous feedstock into a reaction chamber; and
    injecting at least one activating gas into the reaction chamber;
    wherein the carbonaceous feedstock and the at least one activating gas are injected into the reaction chamber under conditions and for a residence time sufficient to form an activated carbon having a halide salt having a cation and an anion dispersed on the surface of the activated carbon.

2. The method of claim 1, wherein the coal comprises a sub-bituminous coal.

3. The method of claim 1, wherein the coal comprises a bituminous coal.

4. The method of claim 1, wherein the coal comprises lignite coal.

5. A method of making catalytic adsorbent for use in the adsorption of mercury from flue gas streams at elevated temperatures, comprising:
    wet mixing a carbonaceous feedstock with a halide salt which is NaBr, KBr or mixtures thereof, wherein the carbonaceous feedstock comprises coal or biomass material;
    drying the mixture of the carbonaceous feedstock and the halide salt;
    injecting the mixed carbonaceous feedstock into a reaction chamber; and
    injecting at least one activating gas into the reaction chamber;
    wherein the carbonaceous feedstock and the at least one activating gas are injected into the reaction chamber under conditions and for a residence time sufficient to form an activated carbon having said halide salt having a cation and an anion dispersed on the surface of the activated carbon.

\* \* \* \* \*